United States Patent
Ichimei et al.

(10) Patent No.: US 12,392,968 B2
(45) Date of Patent: Aug. 19, 2025

(54) OPTICAL DEVICE, OPTICAL MODULATION DEVICE AND OPTICAL TRANSMISSION DEVICE

(71) Applicant: SUMITOMO OSAKA CEMENT CO., LTD., Tokyo (JP)

(72) Inventors: Hideki Ichimei, Tokyo (JP); Kei Kato, Tokyo (JP)

(73) Assignee: SUMITOMO OSAKA CEMENT CO., LTD., Tokyo (JP)

(*) Notice: Subject to any disclaimer, the term of this patent is extended or adjusted under 35 U.S.C. 154(b) by 0 days.

(21) Appl. No.: 18/028,466

(22) PCT Filed: Sep. 30, 2021

(86) PCT No.: PCT/JP2021/036269
§ 371 (c)(1),
(2) Date: Mar. 24, 2023

(87) PCT Pub. No.: WO2023/053402
PCT Pub. Date: Apr. 6, 2023

(65) Prior Publication Data
US 2024/0310584 A1    Sep. 19, 2024

(51) Int. Cl.
*G02B 6/30* (2006.01)
*G02F 1/01* (2006.01)

(52) U.S. Cl.
CPC ............... *G02B 6/30* (2013.01); *G02F 1/011* (2013.01)

(58) Field of Classification Search
CPC .................. G02B 6/30; G02F 1/011
See application file for complete search history.

(56) References Cited

U.S. PATENT DOCUMENTS

2003/0077054 A1* 4/2003 Marazzi ............... G02B 6/4202
385/88
2019/0302471 A1* 10/2019 Hara ..................... G02B 5/3083

FOREIGN PATENT DOCUMENTS

| EP | 1306703 A1 | 5/2003 |
| JP | H9-1997-5600 A | 1/1997 |
| JP | H9-15437 A | 1/1997 |
| JP | 2004-294918 A | 10/2004 |
| JP | 2012-68533 A | 4/2012 |
| JP | 2019-179066 A | 10/2019 |
| JP | 2020-091378 A1 | 6/2020 |

* cited by examiner

*Primary Examiner* — Michael P Mooney
(74) *Attorney, Agent, or Firm* — IpHorgan Ltd.

(57) ABSTRACT

An object is to provide an optical device for which size reduction can be achieved, and for which an increase in manufacturing cost is suppressed. An optical device of the present invention is an optical device in which an optical component is accommodated inside a case, the optical device including an optical component fixing member OF on which the optical component is mounted, in which a side surface portion CS and a bottom surface portion CB of the case are joined, and the optical component fixing member OF abuts on the side surface portion CS and is joined to the bottom surface portion CB.

8 Claims, 5 Drawing Sheets

OPTICAL DEVICE, OPTICAL MODULATION DEVICE AND OPTICAL TRANSMISSION DEVICE

CROSS REFERENCE TO RELATED APPLICATIONS

This application is a national stage completion application of PCT Application No. PCT/JP2021/036269, filed Sep. 30, 2021. The PCT application is incorporated by reference herein in its entirety.

TECHNICAL FIELD

The present invention relates to an optical device, an optical modulation device, and an optical transmission device and particularly, to an optical device that accommodates an optical component inside a case, and that includes an optical component fixing member on which the optical component is mounted.

BACKGROUND ART

In the field of optical measurement technology or in the field of optical communication technology, various optical devices such as an optical modulation device have been used. In these optical devices, optical components such as an optical waveguide device, a lens, and a mirror are fixedly disposed inside a case. Particularly, in an optical device including a polarization beam combining module, more optical components such as a waveplate and a beam shifter having a polarization combining function need to be fixedly disposed inside a case.

In order to facilitate optical axis matching (alignment) among light beams of a plurality of optical components, an optical component fixing member (positioning means) on which the optical components are mounted is used as illustrated in Patent Literature No. 1. Specifically, a protruding portion is provided on a part of a surface of the fixing member, and the optical components are fixed in a state of being contact with the protruding portion. The optical component fixing member on which the plurality of optical components are mounted and fixed is joined to a bottom surface portion inside the case. Furthermore, a level difference is formed on a surface of the bottom surface portion through a cutting process or the like, and the optical component fixing member is fixed in a state of being contact with a side surface of the level difference.

On the other hand, size reduction and high performance have been required for the optical devices. Not only an optical waveguide substrate in which an optical waveguide such as an optical modulation device (optical waveguide device) and a modulation electrode is disposed on the substrate is disposed inside the case, but also, furthermore, a termination substrate and a driver IC substrate are mounted inside the case. The termination substrate is a substrate provided with a termination resistor that terminates a modulation signal applied to the optical modulation device. The driver IC substrate is a substrate provided with a driver IC that amplifies the modulation signal with which the optical modulation device is driven.

In such an optical device, a case of a compound material of which a case size is small (for example, the size of the case is 30 mm or lower in length×12 mm or lower in width), and in which different materials are used between a bottom surface portion and a side surface portion of the case. For example, Kovar or ceramic is used for the side surface portion, and copper tungsten is used for the bottom surface portion.

Figure 1:
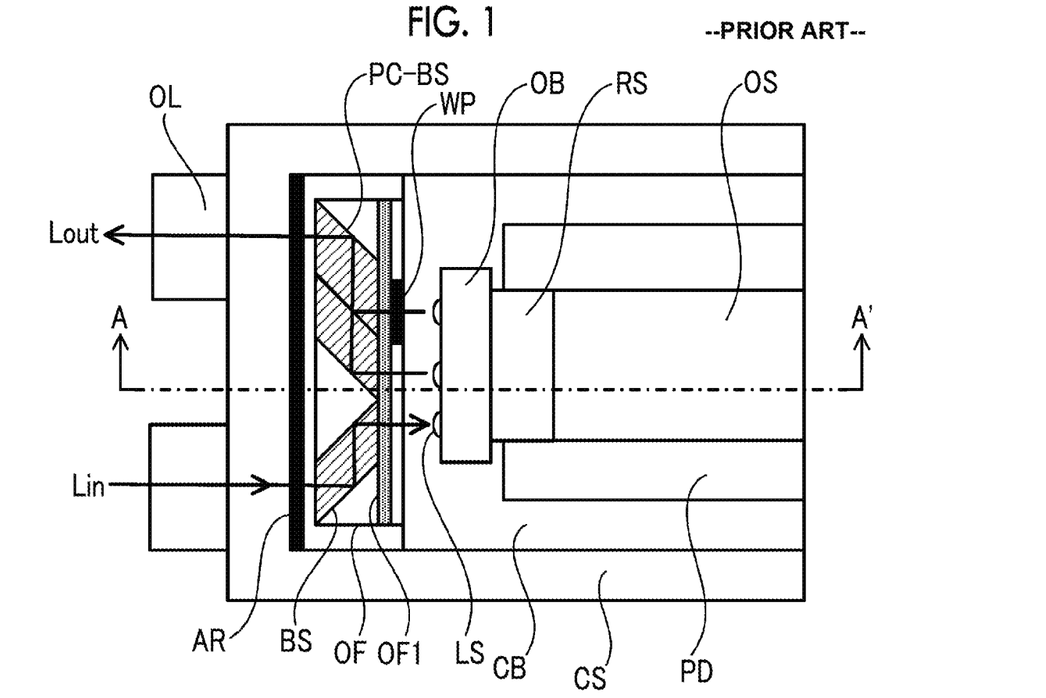
FIG. 1 is a plan view illustrating an example of an optical device in the related art.
Figure 2:
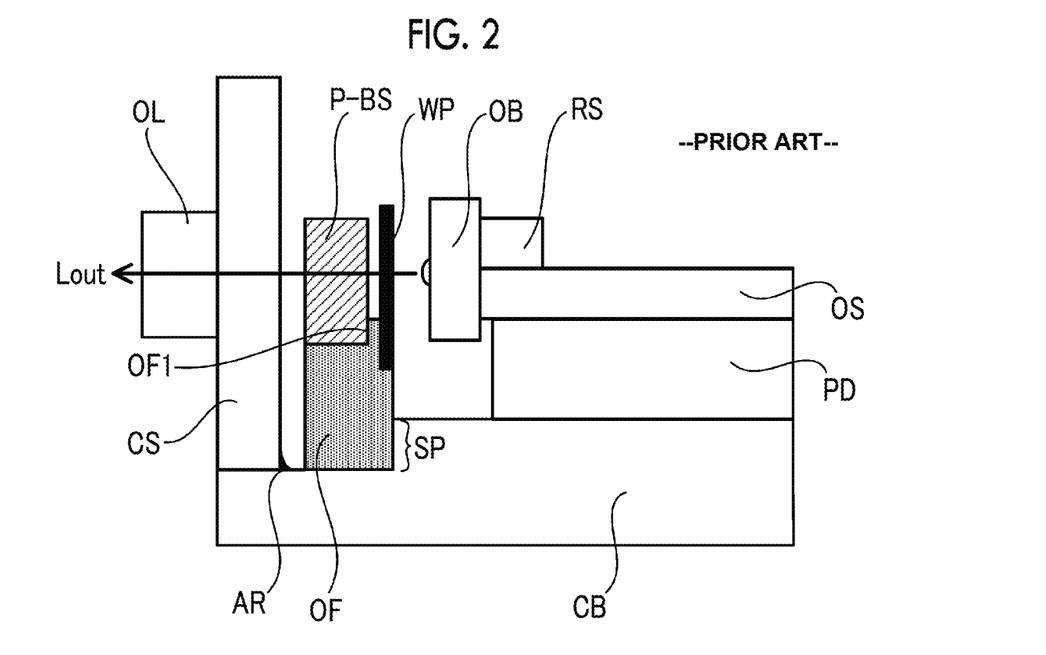
FIG. 2 is a cross section view along dot-dashed line A-A' in FIG. 1.
Figure 3:
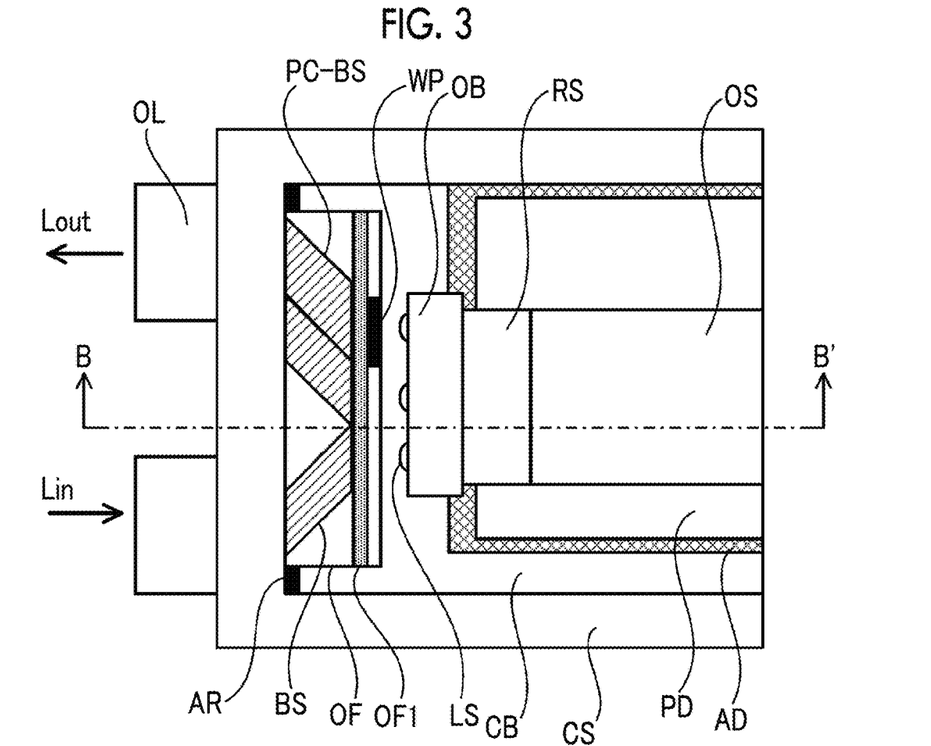
FIG. 3 is a plan view illustrating a first example of an optical device according to the present invention.

FIG. 1 is a plan view illustrating an example of the optical device, and FIG. 2 illustrates a cross section view along dot-dashed line A-A' in FIG. 1.

Reference sign OS denotes an optical waveguide substrate. As illustrated by an arrow, a light wave Lin is input into an optical waveguide (not illustrated) formed in the optical waveguide substrate OS, and a light wave (Lout) output from the optical waveguide substrate OS is derived to an outside.

An optical block OB in which an optical lens LS is disposed is fixed at one end of the optical waveguide substrate OS is fixedly disposed in a bottom surface portion CB of the case using a pedestal PD. In addition, a polarization combining beam shifter (PC-BS) including a half-wavelength plate WP, a beam shifter, and a polarization combining mechanism is fixedly mounted on an optical component fixing member OF as a polarization beam combining module. The half-wavelength plate WP, a beam shifter BS, the polarization combining beam shifter (PC-BS), and the like are positioned to abut on a raised portion OF1 of the fixing member.

The optical component fixing member OF is joined to the bottom surface portion CB inside the case. Particularly, a level difference SP formed in the bottom surface portion of the case is used to fixedly dispose the optical component fixing member by bringing the optical component fixing member into contact with a side surface of the level difference SP. Reference sign RS denotes a reinforcing member that reinforces an end portion of the optical waveguide substrate OS to assist joining of the optical block OB. In addition, reference sign OL denotes a lens barrel or the like in which a lens or the like disposed outside the case is accommodated. An optical fiber (not illustrated) fixed to the lens barrel is optically coupled to the optical waveguide formed in the optical waveguide substrate OS.

A through-hole (not illustrated) is formed at a position at which the light wave crosses a side surface portion CS of the case.

The side surface portion CS and the bottom surface portion CB of the case need to be joined as illustrated in FIG. 2. While a joining material or an adhesive is used for joining, the joining material or the like protrudes from a joining position between the side surface portion CS and the bottom surface portion CB, and a protruding portion AR having a curved surface is formed in a corner portion of the bottom surface portion inside the case. Particularly, in a case where the case is configured by joining different types of materials, a brazing material (Au/Sn or the like) is used. Thus, a larger protruding portion AR is formed in the corner portion of the bottom surface portion inside the case, compared to a case in which a side surface portion and a bottom surface portion inside the case are formed by machine cutting in the related art.

In a case where such a protruding portion AR is present, the optical component fixing member OF needs to be disposed by avoiding the protruding portion AR. Thus, as illustrated in FIG. 2, a gap is formed between the optical component fixing member OF and the side surface portion CS of the case, and this is one of causes that inhibit size reduction of the optical device. In addition, while the protruding portion AR can be removed through the cutting process in order to avoid occurrence of the gap, the cutting process incurs an additional expense, and this causes an increase in manufacturing cost.

Furthermore, as illustrated in FIG. 2, the cutting process needs to be performed on a surface of the bottom surface portion CB in order to form the level difference SP for positioning the optical component fixing member OF in the bottom surface portion CB of the case. Accordingly, not only the manufacturing cost is increased, but also an extra moving space of the optical component fixing member OF is necessary so that a work of bringing the optical component fixing member OF into contact with the level difference SP can be performed. Thus, this is also a cause that inhibits size reduction of the optical device.

In a case where a large space is occupied with respect to disposing and fixing of the optical component fixing member OF, a space for mounting other optical components and electric components is obviously reduced, and it is more difficult to achieve size reduction of the optical device.

CITATION LIST

Patent Literature

[Patent Literature No. 1] Japanese Laid-open Patent Publication No. 2019-179066

SUMMARY OF INVENTION

Technical Problem

An object to be solved by the present invention is to solve the above problem and to provide an optical device for which size reduction can be achieved, and for which an increase in manufacturing cost is suppressed. In addition, an optical modulation device employing a structure of the optical device and an optical transmission device using the same are provided.

Solution to Problem

In order to solve the above objects, an optical device, an optical modulation device, and an optical transmission device of the present invention have the following technical features.

(1) An optical device in which an optical component is accommodated inside a case includes an optical component fixing member on which the optical component is mounted, in which a side surface portion and a bottom surface portion of the case are joined, and the optical component fixing member abuts on the side surface portion and is joined to the bottom surface portion.

(2) In the optical device according to (1), the optical component fixing member has a recess portion for separating the optical component fixing member from a corner portion inside a location in which the side surface portion and the bottom surface portion of the case are joined.

(3) In the optical device according to (1) or (2), the optical component fixing member is formed of a laminated body.

(4) In the optical device according to any one of (1) to (3), a pedestal joined to the bottom surface portion is disposed on a side of the optical component fixing member opposite to a side on which the side surface portion is disposed, another optical component that is disposed to protrude to a side on which the optical component fixing member is disposed from the pedestal is provided on the pedestal, and a part in which a part of the optical component fixing member enters between the other optical component and the bottom surface portion is provided.

(5) In the optical device according to any one of (1) to (4), the side surface portion and the bottom surface portion of the case are formed of different materials.

(6) In the optical device according to any one of (1) to (5), the bottom surface portion inside the case has a flat shape.

(7) An optical modulation device includes the optical device according to any one of (1) to (6), the optical device includes an optical waveguide device accommodated inside the case, and an optical fiber through which a light wave is input to or output from an optical waveguide inside the optical waveguide device.

(8) In the optical modulation device according to (7), the optical waveguide device includes a modulation electrode for modulating the light wave propagating through the optical waveguide, and an electronic circuit that amplifies a modulation signal to be input into the modulation electrode of the optical waveguide device is provided inside the case.

(9) An optical transmission device includes the optical modulation device according to (7) or (8), an electronic circuit that outputs a modulation signal causing the optical modulation device to perform a modulation operation.

Advantageous Effects of Invention

In the present invention, an optical device in which an optical component is accommodated inside a case includes an optical component fixing member on which the optical component is mounted, in which a side surface portion and a bottom surface portion of the case are joined, and the optical component fixing member abuts on the side surface portion and is joined to the bottom surface portion. Thus, the side surface portion can be used for positioning of the optical component fixing member, and a gap does not occur between the side surface portion and the optical component fixing member. In addition, a level difference for the optical component fixing member does not need to be formed in the bottom surface portion of the case. Size reduction of the optical device can be achieved, and an increase in manufacturing cost can be suppressed.

An optical modulation device and an optical transmission device having the same effect can also be provided.

Furthermore, since the optical component fixing member has a recess portion for separating the optical component fixing member from a corner portion inside a location in which the side surface portion and the bottom surface portion of the case are joined, the optical component fixing member can be disposed and fixed without cutting out a joining material or the like such as a brazing material that protrudes in joining between the side surface portion and the bottom surface portion. Thus, an increase in manufacturing cost can be further suppressed.

DESCRIPTION OF EMBODIMENTS

Hereinafter, an optical device, an optical modulation device, and an optical transmission device of the present invention will be described in detail using preferred examples.

As illustrated in FIGS. 3 to 8, the optical device of the present invention is characterized by an optical device in which an optical component is accommodated inside a case, the optical device including an optical component fixing member OF on which the optical component is mounted, in which a side surface portion CS and a bottom surface portion CB of the case are joined, and the optical component fixing member OF abuts on the side surface portion CS and is joined to the bottom surface portion CB.

In the present invention, "abut" refers to a state where an inner wall of the side surface portion CS of the case and the optical component fixing member OF are directly in contact with each other without being fixed with an adhesive, a brazing material, or the like.

In addition, in the present invention, "join" refers to a state where the bottom surface portion CB of the case and the optical component fixing member OF are fixed with an adhesive, a brazing material, or the like.

In FIGS. 3 to 8, the optical modulation device including a polarization beam combining module is illustrated as in FIGS. 1 and 2 illustrating an optical device of the related art. Members for which the same reference signs as the members described in FIGS. 1 and 2 are used mean the same members as in FIGS. 1 and 2 unless otherwise specified.

Figure 4:
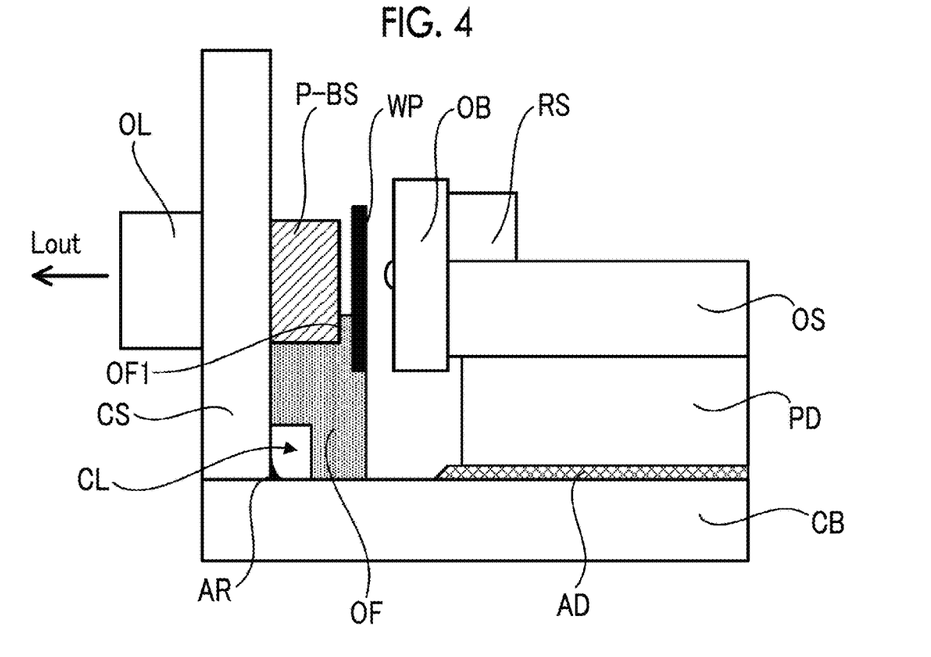
FIG. 4 is a cross section view along dot-dashed line B-B' in FIG. 3.

In the drawings, while the optical component fixing member OF and a beam shifter BS or a beam shifter (PC-BS) having a polarization combining function are drawn in almost the same size, the beam shifter (BS, PC-BS) is smaller than the optical component fixing member OF in actual size. In addition, in joining of the relatively thick beam shifter (a prism or the like) BS and a thin waveplate WP to the optical component fixing member, in order to increase joining strength to the optical component fixing member, a depth (in an up-down direction in FIG. 4) of a part (a contact part between the waveplate WP and the fixing member) related to positioning in the fixing member is generally deeper for the waveplate WP as illustrated in FIG. 4.

A feature of the optical device of the present invention is use of the side surface portion CS of the case for positioning of the optical component fixing member OF. Particularly, as illustrated in FIGS. 3 to 8, by using the side surface portion of the case through which a light wave enters and exits, more accurate positioning can be performed between an optical component such as a lens barrel OL outside the side surface portion and the optical component fixing member OF inside the side surface portion.

As described above, a material constituting the case has been configured with two or more different types of materials (Kovar, copper-tungsten, ceramics, and the like) in accordance with size reduction and multi-functionalization of the optical device. Thus, Kovar used in the side surface portion and an alloy of copper-tungsten or the like used in the bottom surface portion are joined using a joining material such as a brazing material (Au/Sn or the like). In a corner portion of a joining portion between the different types of materials, the brazing material or the like protrudes to form a protruding portion AR. This protruding portion AR enables sufficient airtightness to be secured.

In the optical device of the present invention, cutting out the protruding portion AR such as the joining material through a cutting step or the like is not necessary from a viewpoint of suppressing an increase in manufacturing cost. In addition, necessity of executing a cutting process or a level difference process on a surface of the side surface portion CS or of the bottom surface portion CB of the case for positioning and the like of the optical component fixing member is low.

As another feature of the optical device of the present invention, the optical component fixing member OF has a recess portion CL for separating the optical component fixing member OF from a corner portion inside a location in which the side surface portion CS and the bottom surface portion CB of the case are joined. Providing the recess portion CL further decreases necessity of removing the protruding portion AR such as the joining material. The presence of the recess portion CL enables the optical component fixing member OF to be positioned against the side surface portion CS of the case without causing a bottom surface of the optical component fixing member OF to be in contact with the protruding portion AR. The recess portion CL can be formed by cutting out a part of the fixing member through the cutting process or the like. In a case of using a laminated body described later, the recess portion CL can be formed by adjusting a shape of a metal plate constituting the laminated body.

Figure 6:
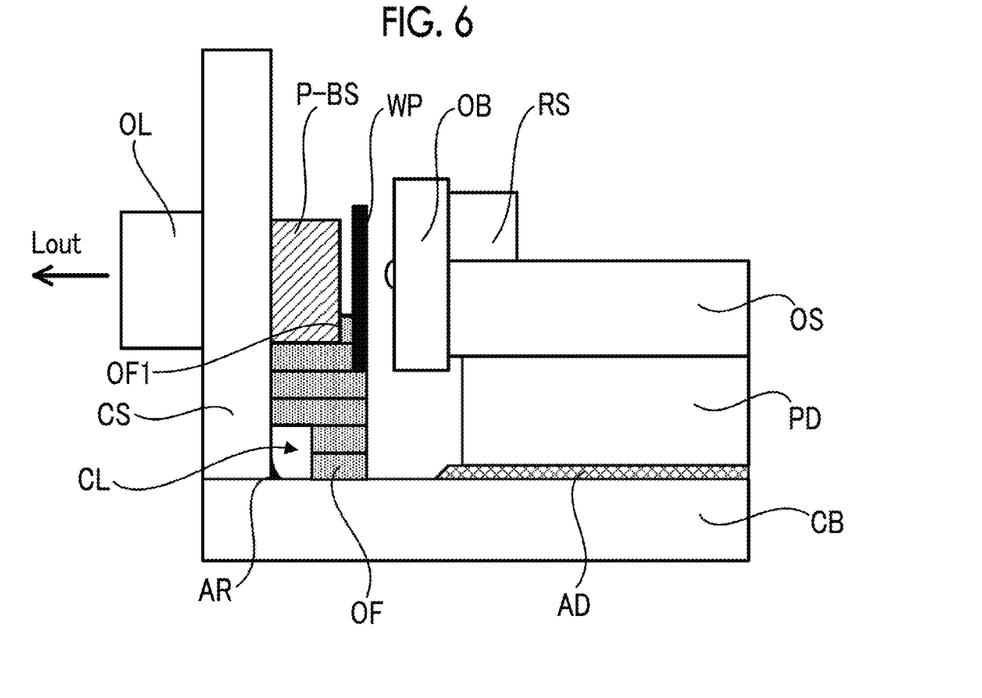
FIG. 6 is a cross section view along dot-dashed line C-C' in FIG. 5.
Figure 8:
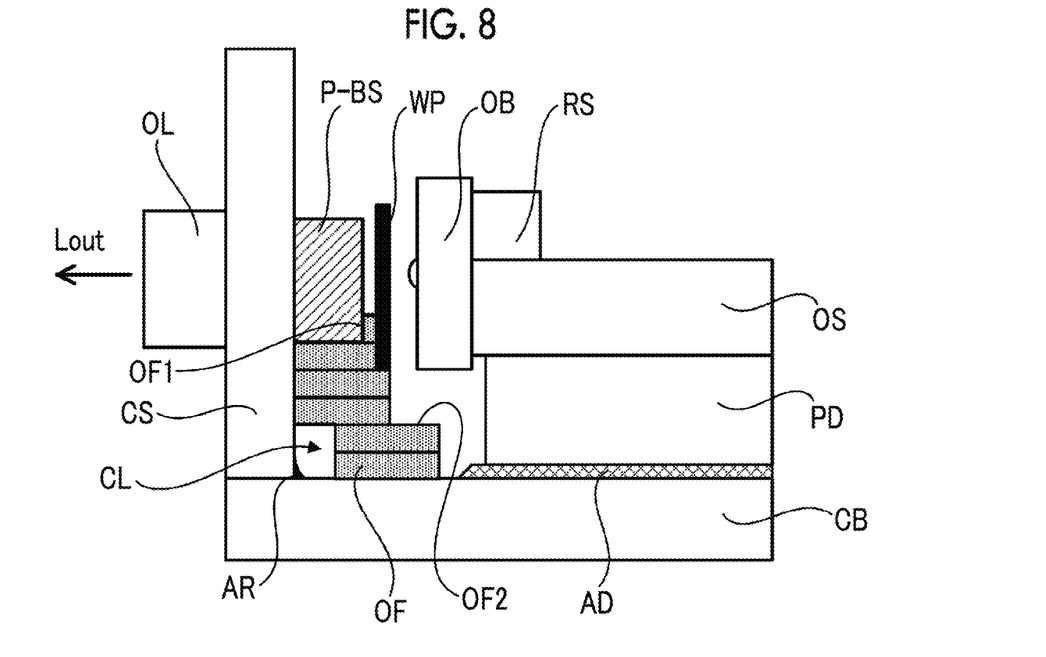
FIG. 8 is a cross section view along dot-dashed line D-D' in FIG. 7.

The optical component fixing member used in the optical device of the present invention can also be formed using the laminated body as illustrated in FIG. 6 or in FIG. 8. A technology for using the laminated body in the fixing member is disclosed in Patent Literature No. 1. For example, the laminated body is configured by laminating thin metal plates (a thickness of each plate is approximately 0.1 to 1 mm) of stainless steel (SUS304 or the like), Kovar, or the like. In FIG. 6, six metal plates are laminated in a direction of a line normal to the bottom surface portion of the case. The metal plate of each layer can have any shape by performing etching or the like using a photoresist. Thus, a degree of freedom in designing the laminated body is improved, and a space inside the case can be more effectively used.

The plurality of thin metal plates are laminated, joined by thermocompression bonding or the like, and integrated. A positioning mark can be provided in each metal plate in laminating, or side surfaces of the laminated metal plates can be firmly coupled by welding or the like.

In addition, in a case where the optical component is large, a side surface for fixing the optical component may be formed by stacking a plurality of metal plates having the same pattern instead of using one metal plate, and by performing thermocompression bonding or the like on all of the metal plates. By doing so, an area of the side surface of the fixing member for fixing the optical component can be increased. Thus, alignment of the optical component is facilitated, and positional accuracy can be improved.

Figure 5:
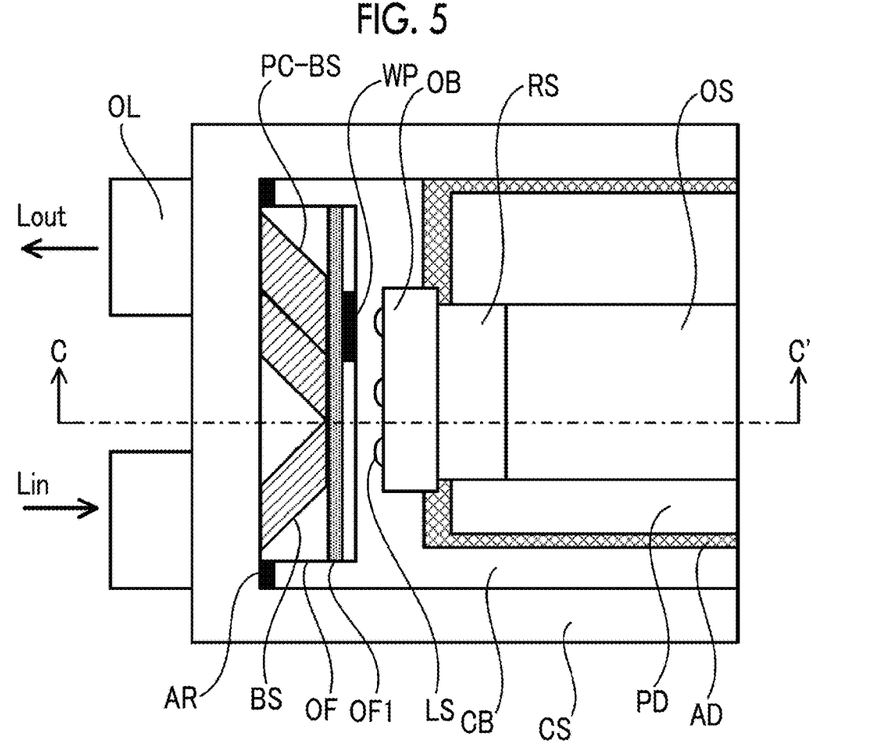
FIG. 5 is a plan view illustrating a second example of the optical device according to the present invention.
Figure 7:
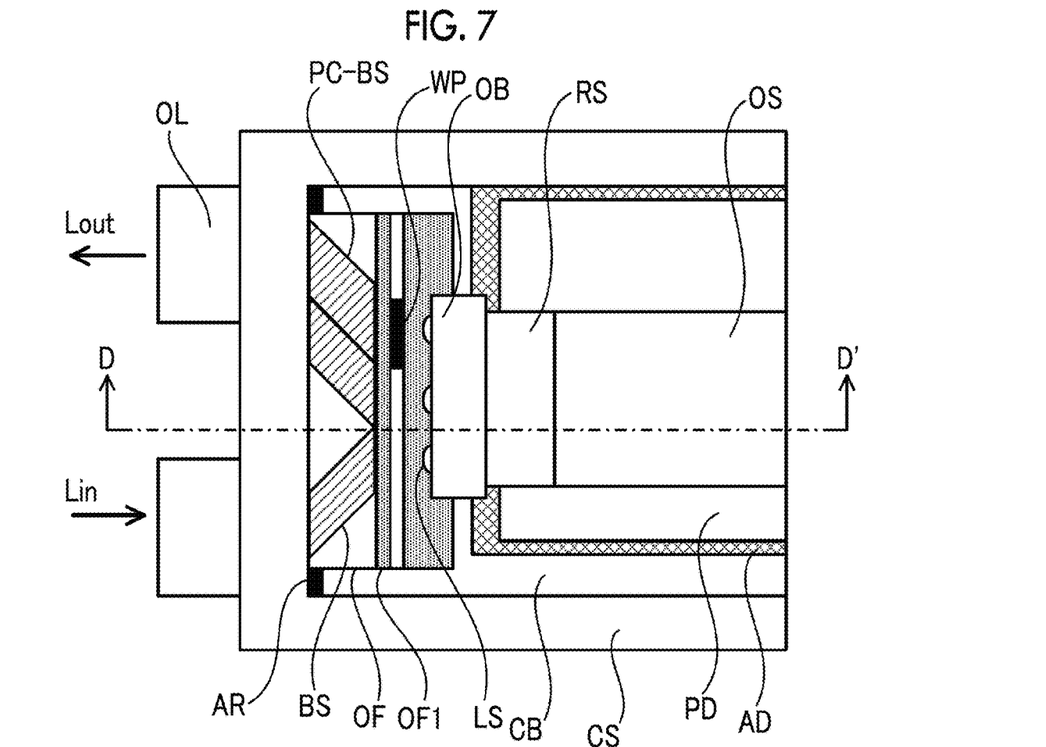
FIG. 7 is a plan view illustrating a third example of the optical device according to the present invention.

Even in the optical device in FIGS. 5 and 6 or in FIGS. 7 and 8, in the location of the optical component fixing member OF facing the joining portion (the corner portion; the protruding portion AR) between the side surface portion and the bottom surface portion inside the case, a recess portion (notch) is formed along the joining portion. Consequently, as illustrated in FIG. 6 (also in FIG. 4), an area of contact between the optical component fixing member OF and the bottom surface portion CB of the case is narrow. In addition, a surface (a surface on an optical waveguide substrate OS side) of the optical component fixing member OF opposite to the side surface portion side of the case is one flat surface (flush). A region in which such an optical component fixing member OF occupies inside the case can be narrowly configured.

In addition, unlike in FIG. 6, a lower part of the metal plates constituting the optical component fixing member OF can be disposed to protrude to the optical waveguide substrate OS side as illustrated in FIG. 8. At this point, metal plates of the same size can be used for two lower metal plates and for the next two metal plates in the middle illustrated in FIG. 8.

Accordingly, in a configuration in which the lower part protrudes, an area in which the optical component fixing member OF is in contact with the bottom surface portion of the case is increased, and disposing and fixing can be stabilized.

While the number of each of the metal plates in the lower part and the next metal plates in the middle is two in the present description, the present invention is not limited to this number.

In addition, while each of the metal plates in the lower part and the next metal plates in the middle are metal plates of the same size, the size of the metal plates in the lower part may be larger than the size of the metal plates in the middle. Accordingly, a center of gravity of the optical component fixing member OF can be lowered, and an area in which the metal plates in the lower part are in contact with the bottom surface portion can be further increased. Thus, the optical component fixing member can be more stably fixed.

Furthermore, a corner portion formed by a protruding part OF2 or the metal plates in the lower part and the next metal plates in the middle is a location to which force is applied in a case of pressing the optical component fixing member OF against the side surface portion CS of the case.

Furthermore, as illustrated in FIG. 8, a pedestal PD joined to the bottom surface portion CB of the case can be disposed on a side of the optical component fixing member OF opposite to a side on which the side surface portion CS of the case is disposed. It can be configured to provide, on the pedestal, another optical component (the optical waveguide substrate OS; an optical block OB) that is disposed to protrude to a side on which the optical component fixing member OF is disposed from the pedestal PD, and to provide a part in which a part (OF2) of the optical component fixing member enters between the other optical component and the bottom surface portion CB.

Such a configuration enables the space inside the case to be more effectively used and enables the optical component fixing member OF and the pedestal PD or the like on which the other optical component is disposed to be closer to each other.

A conductive adhesive or solder is used to fix the pedestal PD to the bottom surface portion CB inside the case as an adhesive AD. A protruding part of the adhesive is formed from a gap between the pedestal PD and the bottom surface portion CB of the case. A recess portion (notch) can also be formed as needed in a part of the optical component fixing member OF close to the pedestal PD.

The present invention is particularly effective in a case where a usable area of the bottom surface portion CB of the case is significantly small because the joining material or the like protrudes from the joining portion between the side surface portion CS and the bottom surface portion CB of the case or from the gap between the pedestal PD and the bottom surface portion CB of the case as described above.

In the latest optical modulation device, a distance between an inner wall of a surface of the side surface portion CS to which the lens barrel OL is attached and the pedestal PD is 3.5 mm or lower, and a distance between the inner wall of the surface of the side surface portion CS to which the lens barrel OL is attached and the optical block OB is 3 mm or lower, which is significantly small. Furthermore, seeping of the brazing material, the adhesive, or the like is approximately 0.5 mm from the side surface portion CS or from the pedestal PD.

Thus, a usable space of the bottom surface portion can be effectively used by employing the configuration of the present invention.

In the case used in the optical device of the present invention, as described above, the side surface portion CS and the bottom surface portion CB of the case that are formed of different materials can be used depending on applications and purposes of the optical device.

In addition, in the optical device of the present invention, the bottom surface portion CB of a flat shape in which a level difference is not formed inside the case can be used. For example, in a case of a small size (30 mm or lower in length×12 mm or lower in width) in which a compound material is used, a positioning process (formation of a level difference) for the optical component fixing member (a size of 7 to 10 mm×1 to 2 mm) does not need to be executed inside the case. Consequently, the optical component fixing member can be disposed and fixed in a smaller space than in a case where the positioning process for the optical component fixing member is performed. Of course, since a level difference is not formed, the optical component fixing member can be accurately mounted at a low cost with good workability using the side surface portion CS of the case.

Next, an example of applying the optical device of the present invention to the optical modulation device and to the optical transmission device will be described. While the optical modulation device using two Mach-Zehnder type optical waveguides will be described below, the present invention is not limited thereto and can also be applied to an optical waveguide device in which a plurality of Mach-Zehnder type optical waveguides are integrated, for example, a high-bandwidth coherent driver modulator (HB-CDM).

Figure 9:
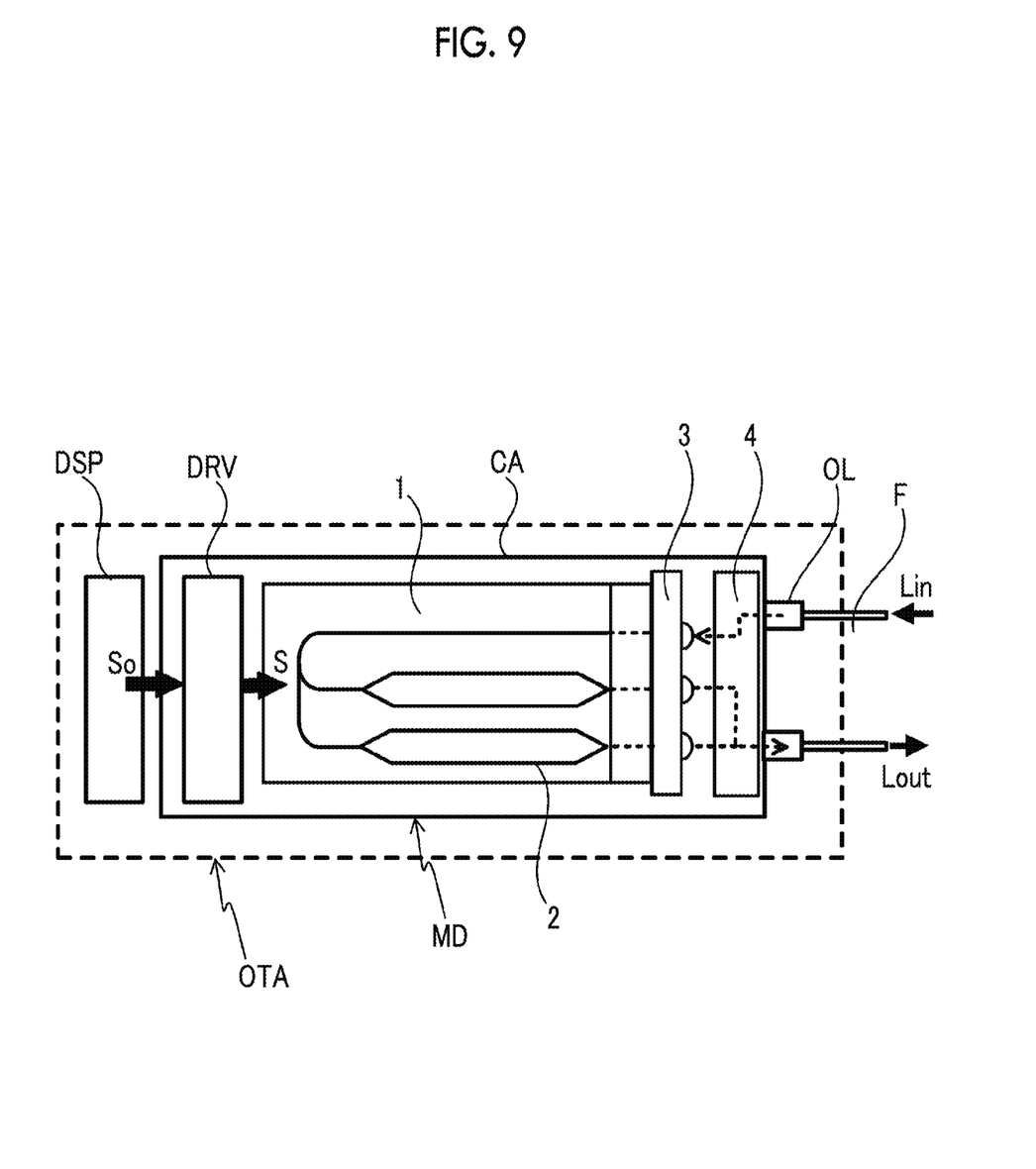
FIG. 9 is a plan view for describing an optical modulation device and an optical transmission device of the present invention.

As illustrated in FIG. 9, the optical waveguide device includes an optical waveguide 2 formed in an optical waveguide substrate 1, and a modulation electrode (not illustrated) that modulates a light wave propagating through the optical waveguide 2. The optical waveguide device is accommodated inside a case CA. Furthermore, an optical modulation device MD can be configured by providing an optical fiber (F) through which the light wave is input and output to and from the optical waveguide. In FIG. 9, the optical fiber F is optically coupled to the optical waveguide inside the optical waveguide device using an optical component fixing member 4 on which an optical component is mounted, an optical block 3 including an optical lens, the lens barrel OL, or the like. The present invention is not limited thereto. The optical fiber may be introduced into the case through a through-hole that passes through a side wall of the case. The optical component and the optical fiber may be directly joined, or the optical fiber having a lens function in an optical fiber end portion may be optically coupled to the optical waveguide inside the optical waveguide device. A dotted line arrow in FIG. 9 indicates an example of an optical path (optical axis).

An optical transmission device OTA can be configured by connecting, to the optical modulation device MD, an electronic circuit (digital signal processor DSP) that outputs a modulation signal causing the optical modulation device MD to perform a modulation operation. The modulation signal to be applied to the optical waveguide device needs to be amplified. Thus, a driver circuit DRV is used. The driver circuit DRV and the digital signal processor DSP can be disposed outside the case CA or can be disposed inside the case CA. Particularly, disposing the driver circuit DRV inside the case can further reduce a propagation loss of the modulation signal from the driver circuit.

INDUSTRIAL APPLICABILITY

As described so far, according to the present invention, an optical device for which size reduction can be achieved, and for which an increase in manufacturing cost is suppressed can be provided. In addition, an optical modulation device employing a structure of the optical device and an optical transmission device using the same can be provided.

REFERENCE SIGNS LIST

AD: adhesive
AR: protruding portion (joining material or like)
BS: beam shifter
CB: bottom surface portion of case
CL: recess portion
CS: side surface portion of case
OB: optical block
OF: optical component fixing member
OF1: raised portion
OL: lens barrel
OS: optical waveguide substrate
PC-BS: beam shifter having polarization beam splitter function
PD: pedestal
RS: reinforcing member

The invention claimed is:

1. An optical device in which an optical component is accommodated inside a case, the optical device comprising:
an optical component fixing member on which the optical component is mounted,
wherein a side surface portion and a bottom surface portion of the case are joined,
the optical component fixing member abuts on the side surface portion and is joined to the bottom surface portion, and
the optical component fixing member has a recess portion for separating the optical component fixing member from a corner portion inside a location in which the side surface portion and the bottom surface portion of the case are joined.

2. The optical device according to claim 1, wherein the optical component fixing member is formed of a laminated body.

3. The optical device according to claim 1, wherein a pedestal joined to the bottom surface portion is disposed on a side of the optical component fixing member opposite to a side on which the side surface portion is disposed,
another optical component that is disposed to protrude to a side on which the optical component fixing member is disposed from the pedestal is provided on the pedestal, and
a part in which a part of the optical component fixing member enters between the other optical component and the bottom surface portion is provided.

4. The optical device according to any one of claims 1 to 3, wherein the side surface portion and the bottom surface portion of the case are formed of different materials.

5. The optical device according to claim 1, wherein the bottom surface portion inside the case has a flat shape.

6. An optical modulation device comprising:
the optical device according to claim 1;
wherein the optical device comprises;
an optical waveguide device accommodated inside the case; and
an optical fiber through which a light wave is input to or output from an optical waveguide inside the optical waveguide device.

7. The optical modulation device according to claim 6, wherein the optical waveguide device includes a modulation electrode for modulating the light wave propagating through the optical waveguide, and
an electronic circuit that amplifies a modulation signal to be input into the modulation electrode of the optical waveguide device is provided inside the case.

8. An optical transmission device comprising:
the optical modulation device according to claim 7; and
an electronic circuit that outputs a modulation signal causing the optical modulation device to perform a modulation operation.

* * * * *